H. B. LAYMAN.
CONNECTING ROD.
APPLICATION FILED APR. 12, 1917.
1,418,086.
Patented May 30, 1922.
3 SHEETS—SHEET 1.
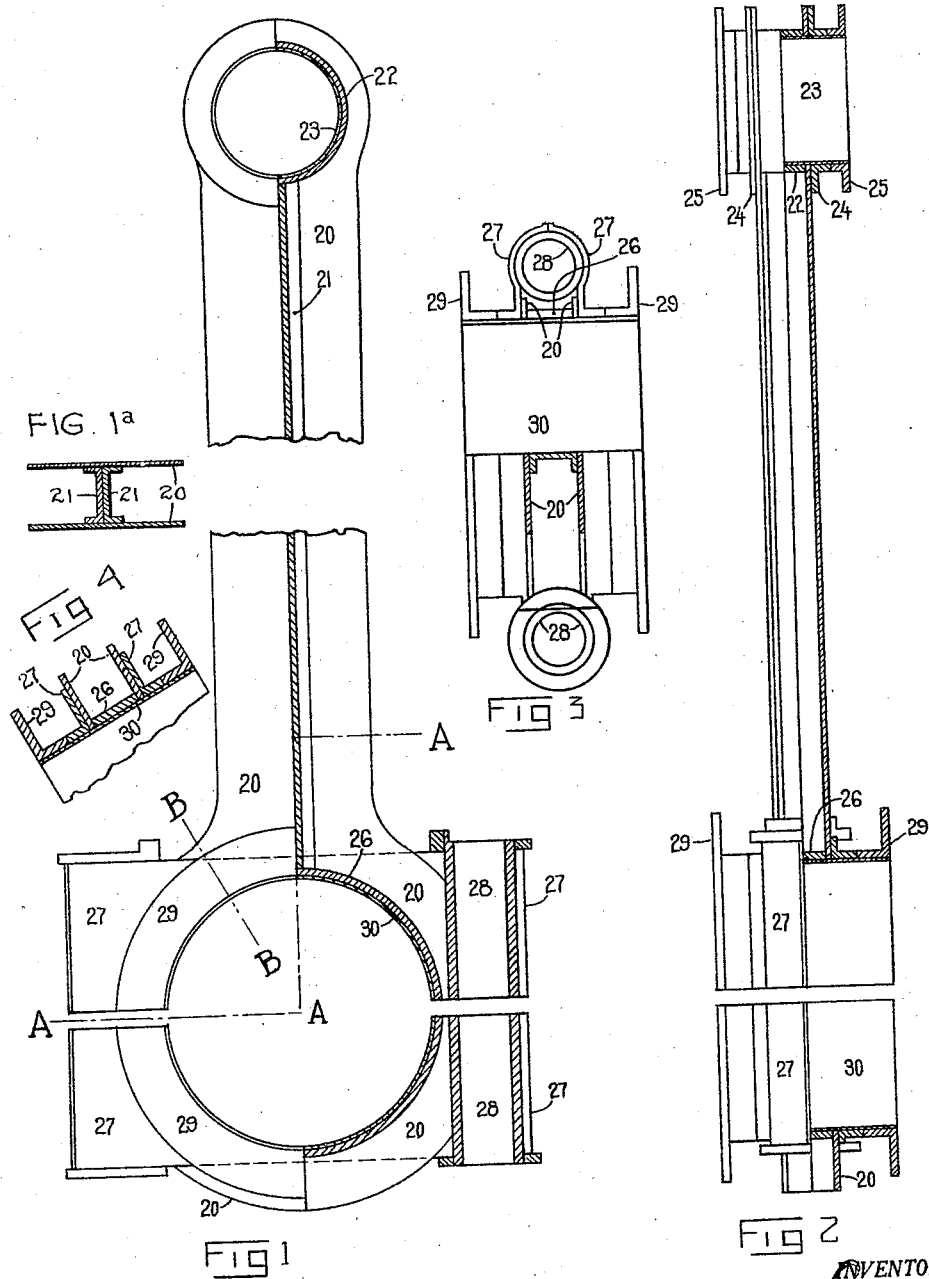
WITNESSES:
INVENTOR.
Hebron Bernard Layman.

H. B. LAYMAN.
CONNECTING ROD.
APPLICATION FILED APR. 12, 1917.
1,418,086.
Patented May 30, 1922.
3 SHEETS—SHEET 2.
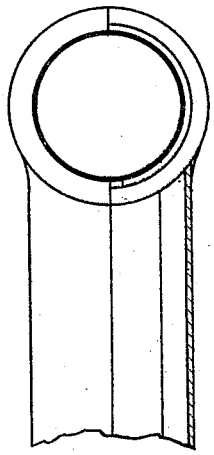
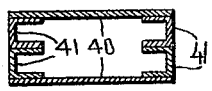
FIG. 5ª
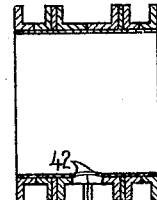
Fig 8
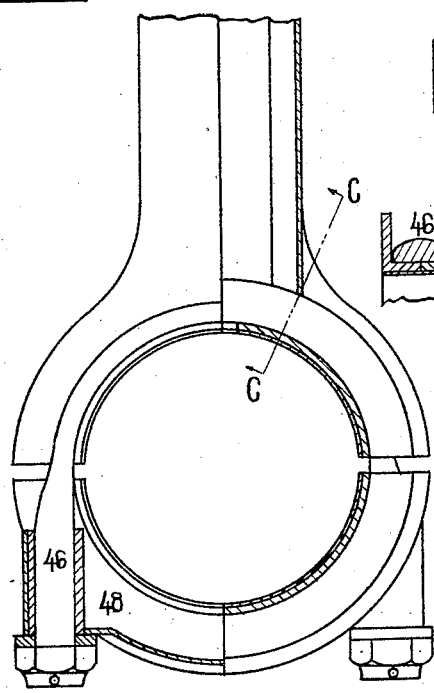
Fig 7
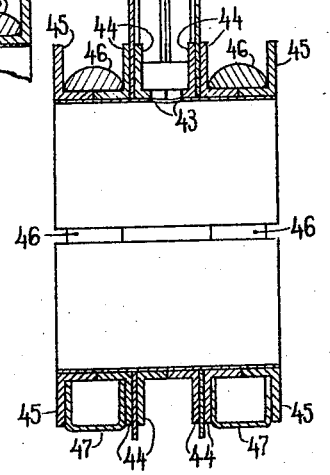
Fig 6
Fig 5
WITNESSES:
W. A. Kosken
Robert Gonzalez
INVENTOR.
Hibron Bernard Layman

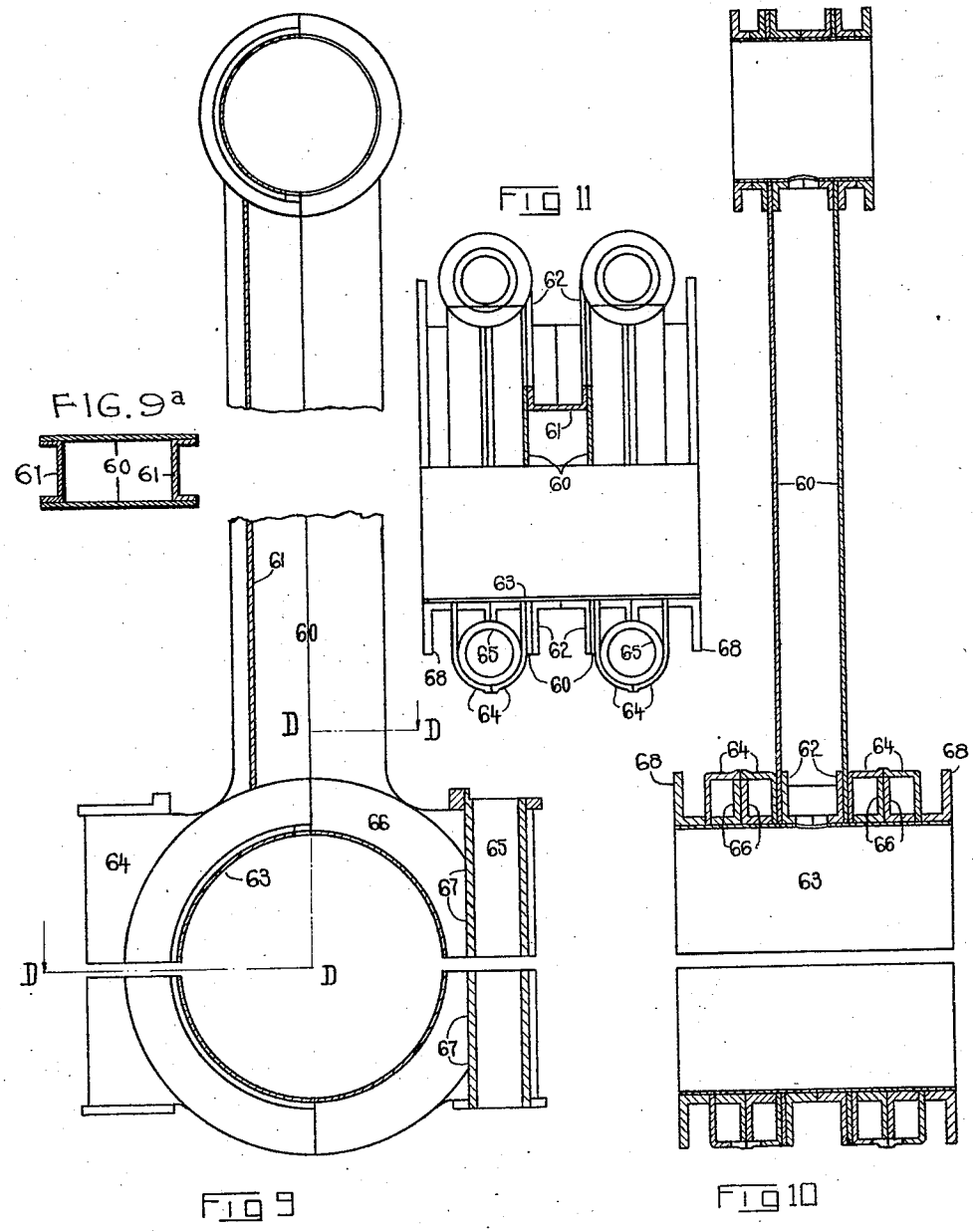

UNITED STATES PATENT OFFICE.

HEBRON BERNARD LAYMAN, OF NEW YORK, N. Y., ASSIGNOR TO THE LAYMAN PRESSED ROD COMPANY, INC., OF NEW YORK, N. Y., A CORPORATION OF NEW YORK.

CONNECTING ROD.

1,418,086.  Specification of Letters Patent.  Patented May 30, 1922.

Application filed April 12, 1917. Serial No. 161,399.

*To all whom it may concern:*

Be it known that I, HEBRON BERNARD LAYMAN, a citizen of the United States, and residing at New York, in the county of New York and State of New York, have invented certain new and useful Improvements in Connecting Rods, of which the following is a specification, such as will enable those skilled in the art to which it appertains to make and use the same.

This invention relates to built-up connecting rods, links, levers and the like, especially sheet metal connecting rods, and is an improvement upon the invention disclosed in my co-pending application, Serial No. 24481, filed April 28th, 1915.

The purpose of this invention is to provide a connecting rod of extremely light weight, in the manufacture of which steel can be used that is of such hardness or density or non-ductility that it cannot be drawn or formed into the shapes demanded by the construction of the rod disclosed in my previous application. This I accomplish by making the rod shell of two substantially similar flat steel plates cut to the desired conformation, and spaced apart and united by intermediate members, which members may also be of rigid high tensile or non-ductile metals.

In a previous application, Serial No. 159,398, filed April 3rd, 1917, I disclosed a built-up sheet metal connecting rod having a skeleton of high tensile material enclosed or encompassed by a thin outer casing of very ductile and light-weight metal. This present invention renders unnecessary the use of the outer casing of my earlier application, the main purpose of which was to give form and comeliness. Other objects will appear hereafter in the specification and claims.

By way of example only, I show in—

Fig. 1 a side elevation, half in section, of a connecting rod embodying features of the invention.

Fig. 1ª is a sectional view of the shank of the rod shown in Fig. 1.

Fig. 2 a side elevation, half in section, of the rod of Fig. 1.

Fig. 3 is a section on the line A—A of Fig. 1, and shows the abutting face of the rod, which is exactly similar to that of the cap.

Fig. 4 is a section on the line B—B of Fig. 1.

Fig. 5 is a side elevation, partly sectioned, of the modified form of connecting rod, embodying features of the invention.

Fig. 5ª is a sectional view of the shank of the rod shown in Fig. 5.

Fig. 6 is an elevation in section on the vertical center line of the rod in Fig. 5.

Fig. 7 is a section on the line C—C of Fig. 5.

Fig. 8 is a modified form of shank.

Fig. 9 is an elevation, partly sectioned, of a four-bolt rod, incorporating some of the features of the present invention.

Fig. 9ª is a sectional view of the shank of the rod shown in Fig. 9.

Fig. 10 is an elevation in section on the vertical center line of the rod in Fig. 9.

Fig. 11 is a section on the line D—D of Fig. 9.

In Figs. 1 to 4 inclusive, 20 are two similar flat plates punched or sheared from high carbon or alloy steels of great tensile strength and rigidity, or from other stiff, rigid or non-ductile sheet metal, such, for instance, as aluminum alloy having a high content of nickel. Such strip or sheet metals cannot be drawn or formed satisfactorily even when hot, and may not be drawn at all when cold. Nevertheless, these metals or alloys because of their fine physical characteristics are ideal material to be used in very light connecting rods for high speed engines. These punched plates are spaced apart and united by two channel section intermediate members 21. As I do not form or bend these channel sections, I am able to use hot rolled channels of high carbon or alloy steels, which are produced in comparatively long strips and cut to suitable length.

In one end, the piston end, of each plate 20, I blank or cut a hole to admit a piston pin. Adjacent thereto, I space apart the side walls with a cuff or bushing 22. Then within the apertures I fit a liner bushing 23, preferably of soft ductile material. To the outer face of each plate 20 I secure a flanged cuff 24, which is assembled on the liner bushing 23. Finally two additional flanged cuffs 25 complete the length of the piston pin boss.

In the manufacture of these rods, I prefer to make the cuffs 22, 24 and 25 of relatively stiff material, and the liner bushing 23 of comparatively soft material, and I secure all the bushings together and to the plates comprising the rod shell by spinning over the ends of the liner bushing 23.

At the crank shaft end of the rod, the plates 20 are similarly apertured, and are here spaced apart by the hard-metal thimble or bushing 26. To the outer faces of the plates 20 I secure formed members 27 of sheet metal, which are drawn to form a part of the crank end boss, and stamped or formed to compose two oppositely disposed bolt bosses. These are fitted with liner bushings 28. The length of the crank pin boss is completed by the addition of the flanged cuffs 29, and these parts are all secured together and to the rod shell by means of the liner bushing 30, which I use as a tubular rivet, spinning over the ends thereof.

In practice, I prefer to lightly weld the channel sections 21 together and to the plates 20, and to seam-weld or otherwise secure together the edges of the formed members 27 in the region of the bolt bosses. I then fuse or braze the parts by immersion in a molten alloy of metals, and thereafter I heat-treat the rod to bring out the desired physical characteristics. Then I finish the rod by machining, and finally divide the larger end transversely to form a cap.

It should be observed that the channel sections extend the entire length of the shank of the rod, and unite with the bushings 22 and 26, and thus serve as a column transmitting the thrust of the piston pin boss to the crank pin boss.

In Figs. 5, 6, and 7, 40 are two similar plates forming part of the rod shell, which are spaced apart and joined by four channel section members 41. The piston pin boss is substantially similar to that of the rod of previous figures, except that it is apertured at 42 to permit the ready ingress and egress of spelter to and from the shank of the rod, as is necessitated in the step of brazing or fusing. Similarly the crank pin boss is apertured at 43. To each side of each body plate 40, are secured similar flanged cuffs 44. Finally the length of the crank pin boss is completed by the addition of flanged cuffs 45. On the rod, channels formed between the cuffs 44 and 45 are adapted to receive U-shaped clamps or bolts 46 for securing the cap to the rod. On the cap the channel spaces between the cuffs 44 and 45 are occupied by formed sheet metal members 47, which are shaped to form bolt bosses.

In Figs. 9, 10 and 11, 60 are the two body plates united at their edges by channel sections 61. To the inner face of each plate at the crank end is secured a flanged cuff or bushing 62, within which is fitted a liner bushing 63. To the outer face of each body plate is joined a bolt boss section, composed of two sheet metal formed members 64, which together form bolt bosses, that are in turn fitted with liners 65. These bolt boss sections are reinforced by flanged cuffs 66, which form part of the crank pin boss, and also unite with the bolt boss liners along the line 67 of Fig. 9. Finally the addition of the flanged cuffs 68 completes the length of his crank pin boss.

Heretofore, I have used the word "shell" in referring to the main part of the connecting rod. By "shell" I mean the shank portion and one or both end portions integral therewith, exclusive of cap or flanged bushings, or liner bushing, or bolt boss bushings, or shank reinforcement, or similar small parts.

My use of the word "shell" will apply with equal force to connecting rods with or without caps. Rods of the latter class I have described in U. S. Patent No. 1,176,300.

Where I use the term "sheet metal" hereinafter in the claims, I wish it understood that I mean any form of metal which partakes of the nature and characteristics of sheet metal, as distinguished from castings and forgings.

Where I use the term "non-ductile material," I wish it expressly understood that I do not mean to restrict myself to metal, and that I use the term by way of description and not limitation, meaning to signify any material having among its chief characteristics hardness as determined by the Brinnell machine and rigidity and non-ductility, whether or not this be metal and if metal, whether of the ferrous or non-ferrous groups.

Having fully described my invention, what I claim as new and desire to secure by Letters Patent, is:—

1. A connecting rod having a shell comprising a plurality of flat sheet metal plates, and means spacing and joining said plates at their end portions.

2. A connecting rod having a shell comprising a plurality of substantially flat plates of relatively non-ductile material, and means spacing and permanently joining said plates at their end portions.

3. A connecting rod having a shell comprising two parallel flat plates spaced apart, and connected in the region of the shank portion by an intermediate member.

4. A connecting rod having a shell comprising two parallel flat plates spaced apart and connected by an intermediate member, and composing a shank and two head ends.

5. A connecting rod having a shell comprising two parallel flat plates spaced apart and permanently united by an intermediate member, each of the plates perforated to provide crank pin and piston pin apertures.

6. A connecting rod having a shell comprising two parallel flat plates spaced apart and connected by an intermediate member, each of the plates perforated to provide a pin aperture, and tubular members permanently united to said plates forming pin bosses.

7. A connecting rod having a shell comprising two parallel flat plates spaced apart and connected by an intermediate member, the said shell provided with crank and piston pin bosses, and the said intermediate member united to the said bosses.

8. A connecting rod having a shell comprising two parallel flat plates spaced apart and connected by an intermediate member, and provided with a crank pin boss, and adapted to be separated through the boss to form a cap.

9. A connecting rod having a shell comprising two parallel flat plates spaced apart and connected by an intermediate member, and provided with a crank pin boss, and members secured to said plates cooperating with cap-fastening means to secure a cap to the rod.

10. A connecting rod having a shell comprising a plurality of flat metal plates united together throughout the entire shank portion thereof.

11. A connecting rod having a shell comprising a plurality of flat metal plates and means spacing and permanently uniting said plates in their end portions.

12. A connecting rod having a shell comprising a plurality of flat metal plates united together throughout their entire length.

HEBRON BERNARD LAYMAN.